3,431,224
POLYCARBONATE RESIN MIXTURES

Kenneth B. Goldblum, Pittsfield, Mass., assignor to General Electric Company, a corporation of New York
No Drawing. Continuation-in-part of application Ser. No. 209,215, July 11, 1962. This application June 3, 1963, Ser. No. 284,799
U.S. Cl. 260—13    2 Claims
Int. Cl. C08g 39/00; C09j 3/14

This invention relates to thermoplastic resin compositions and more particularly is concerned with polycarbonate resin mixtures having improved resistance to environmental stress crazing and cracking.

This application is a continuation-in-part of my copending application Ser. No. 209,215, filed July 11, 1962, now abandoned.

Aromatic carbonate polymers are well known, commercially available materials having a variety of applications in the plastics art. Such carbonate polymers may be prepared by reacting a dihydric phenol, such as 2,2-bis-(4-hydroxyphenyl)-propane, with a carbonate precursor such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength, a high heat resistance, and a dimensional stability far surpassing that of any other thermoplastic material. However, in certain applications the use of aromatic polycarbonate resins is limited since they exhibit severe environmental stress crazing and cracking. By "environmental stress crazing and cracking" I refer to the type of failure which is hastened by the presence of organic solvents such as, for example, acetone, heptane and carbon tetrachloride when such solvents are in contact with stressed parts fabricated from aromatic polycarbonate resins. Such contact may occur, for example, when the solvents are used to clean or degrease stressed parts fabricated from polycarbonate resins.

As known to those skilled in the art, the environmental stress crazing and cracking characteristics of polycarbonate resins have been termed their most serious deficiency, and a variety of methods have been proposed in an effort to reduce the propensity of stressed polycarbonate parts to craze and crack while in contact with organic solvents such as those mentioned above. To the best of my knowledge, however, such methods have never been entirely satisfactory since they generally have an adverse effect upon the desirable properties of polycarbonate resins. Consequently, a means for reducing the environmental stress crazing and cracking of polycarbonate resins without appreciably affecting any of their desirable properties has heretofore not been available.

Unexpectedly, I have discovered that polycarbonate resins may be rendered more resistant to environmental stress crazing and cracking by incorporating therewith, in certain proportions, at least one member of the class consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ether, and a polyurethane elastomer.

Briefly stated, I have found that when one or more of the above mentioned modifiers are added to the polycarbonate resin within a certain range, the resultant mixture possesses a resistance to environmental stress crazing and cracking greater than that possessed by the polycarbonate resin itself. In accordance with my invention, it has been found that this highly desirable property is obtained when the modifier is added to the polycarbonate resin in amounts ranging from about 0.25% to about 50% by weight (of the polycarbonate resin and modifier). Generally speaking, when amounts less than about 0.25% are used, the improvement in the craze resistance of the polycarbonate is not readily detectable, and where the amount exceeds about 50%, the mixture begins to lose the beneficial properties of the polycarbonate. Preferably, the modifier is added in amounts ranging from 3% to about 25% of the total weight of the modifier and polycarbonate. Such addition may be accomplished in any manner so long as a thorough distribution of the modifier in the polycarbonate resin is obtained. For example, the mixing of materials may be accomplished by a variety of methods normally employed for incorporation of plasticizers or fillers into thermoplastic polymers including but not limited to mixing rolls, doughmixers, Banbury mixers, extruders, and other mixing equipment. The resulting mixtures may be handled in any conventional manner employed for the fabrication or manipulation of thermoplastic resins. The materials may be formed or molded using compression, injection, calendering and extrusion techniques. It should be understood that the polycarbonate resin mixtures prepared in accordance with the invention may also contain, in addition to one or more of the above mentioned polymers, other additives to lubricate, prevent oxidation, or lend color to the material. Such additives are well known in the art, and may be incorporated without departing from the scope of the invention.

In addition to exhibiting an increased resistance to environmental stress crazing and cracking, the improved polycarbonate resin mixtures of the invention exhibit a relatively high impact strength without a substantial loss of tensile properties, and to a large extent retain the high softening temperatures of unmodified polycarbonate resin materials.

The fact that the addition of one more of the above mentioned modifiers to a polycarbonate resin system provides a resinous mixture having an improved resistance to environmental stress crazing and cracking is totally unexpected and is not fully understood. For example, the above mentioned modifiers used to provide the improved polycarbonate resin mixtures of the invention may themselves be subject to crazing and cracking while under stress and in contact with various organic solvents, and accordingly would not be expected to improve the environmental stress craze and crack resistance of other thermoplastic materials.

Generally speaking, the modifiers which are admixed with polycarbonate resins to provide the resin mixtures of the invention are themselves well known commercially available thermoplastic resin materials. In general, any polyethylene, whether linear or cross-linked, may be employed to provide the resinous mixtures of the invention. The densities and melt indices of the polyethylenes used in such capacities have been found not to be critical. For example, polyethylenes having densities as low as 0.91 and as high as 0.98, with melt indices ranging from 0.18 to 50 have been employed in various combinations with polycarbonate resins with beneficial results as far as the improvement of environmental crazing and cracking resistance is concerned. However, from the standpoint of general appearance of molded parts prepared from polycarbonate-polyethylene mixtures, the preferred range of density of polyethylene is from 0.95 to 0.97 with the melt index ranging from 0.18 to 9.0. Similarly, any linear or cross-linked polypropylene may be employed. As in the case of polyethylene, the melt index and density of the polypropylene useful in the practice of the invention is not critical. However, a polypropylene having a density of the order of 0.91 and a melt index ranging from 0.7 to 12.0 is generally preferred.

Both the linear and cross-linked polymers of ethylene with propylene may also be advantageously employed to provide the polycarbonate mixtures of the invention. As in the cases of polyethylene and polypropylene, the melt indices and densities of ethylene-propylene copolymers are not critical from the standpoint of their use in accordance with the invention.

The isobutylene polymers useful to provide the resin mixtures of the invention have, in general, molecular weights greater than 75,000 and preferably of the order of 100,000–200,000 and above, with a density of the order of 0.8–1.0.

The ethylene-alkyl acrylate copolymers useful in the practice of the invention are the well known copolymers of ethylene with alkyl ester of acrylic acid. Generally speaking, such polymers contain recurring structural units of the formula

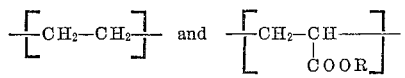

where R is an alkyl radical containing from 1 to about 15 carbon atoms such as for example, methyl, ethyl, propyl, butyl, hexyl, heptyl and 2 ethyl hexyl. Examples of copolymers of ethylene with alkyl acrylates which are particularly suitable in the practice of the invention are disclosed in U.S. Patent 2,953,551. Generally, such copolymers have densities of the order of 0.915–0.94 and a ratio of the

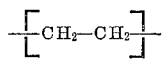

units to the

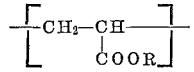

units of from about 65:1 to about 500:1.

The cellulose esters used to provide the craze resistant polycarbonate resin mixture of the invention are characterized by a specific gravity of from 1.14 to 1.24, a softening temperature ranging from about 140–250° F. and an average molecular weight, as determined by viscosity measurements, ranging from about 12,000 to about 150,000. Examples of such cellulose esters are cellulose acetate, cellulose propionate and cellulose acetate butyrate.

The polyurethane elastomers useful in the present invention are the condensation products of a diisocyanate, a hydroxy terminated polyether or polyester, and a glycol or a diamine. Such materials are characterized by a specific gravity of from about 1.19 to about 1.26 and a tensile strength of from about 2,500 to about 20,000 p.s.i. Examples of suitable materials are the condensation products of diisocyanates such as 2,4-tolylene diisocyanate, 1,5-naphthalene diisocyanate and 2,7-fluorene diisocyanate, with a polyester such as, for example, polyethylene succinate or polyethylene adipate, and a glycol such as ethylene glycol or 1,4-butane diol.

The nylon polymers useful to provide the resin mixtures of the invention may be any long chain synthetic polymeric amides having recurring amide groups as integral parts of the main polymer chain and which may be formed into a filament in which the structural elements are oriented in the direction of the axis. Typical examples of nylons useful in the practice of the invention are nylon 6/6, which is the polymeric condensation product of hexamethylenediamine and adipic acid, (polyhexamethylene adipamide); nylon 6 (polycapalactam); nylon 6/10 (polyhexamethylenesebacamide); nylon 8 (n-alkoxy methyl substituted polyhexamethylene adipamide). Generally speaking, such nylon polymers will have a specific gravity ranging from about 1.08 to about 1.17 and a tensile strength ranging from about 7,000 to about 12,000 p.s.i.

The polyvinyl acetals which may be used in the practice of the invention are the condensation products of polyvinyl alcohol and an aldehyde such as, for example, acetaldehyde, butyraldehyde and formaldehyde. Examples of such polymers are polyvinyl formal and polyvinyl butyral. In general such polyvinyl acetals will have a molecular weight of from about 16,000 to about 270,000, a specific gravity of 1.05–1.4 and a tensile strength of from about 500–12,000 p.s.i.

The alkyl cellulose ethers useful to provide the craze-resistant polycarbonate resin mixtures of the invention are also well known materials and are characterized by a specific gravity of from 1.09 to 1.17 and a tensile strength of from about 2,000 to about 8,000 p.s.i. Examples of such cellulose ethers are methyl cellulose, ethyl cellulose and butyl cellulose.

The aromatic carbonate polymers used to provide polycarbonate mixtures of the present invention may be prepared by reacting a dihydric phenol with a carbonate precusor such as phosgene, a haloformate or a carbonate ester. Generally speaking, such carbonate polymers may be typified as possessing recurring structural units of the formula

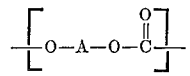

where A is a divalent aromatic radical of the dihydric phenol employed in the polymer producing reaction. Preferably, the carbonate polymers used to provide the resinous mixtures of the invention have an intrinsic viscosity (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, 2 hydroxyl radicals, each of which is attached directly to a carbon atom of an aromatic nucleus. Typical dihydric phenols are 2,2-bis-(4-hydroxyphenyl)-propane;
hydroquinone;
resorcinol;
2,2-bis-(4-hydroxyphenyl)-pentane;
2,4'-dihydroxy diphenyl methane;
bis-(2-hydroxyphenyl) methane;
bis-(4-hydroxyphenyl)-methane;
bis-(4-hydroxy-5-nitrophenyl)-methane; 1,1-bis-(4 - hydroxyphenyl)-ethane;
3,3-bis-(4-hydroxyphenyl)-pentane;
2,2'-dihydroxydiphenyl;
2,6-dihydroxy naphthalene;
bis-(4-hydroxyphenyl) sulfone;
2,4'-dihydroxydiphenyl sulfone;
5'-chloro-2,4'-dihydroxydiphenyl sulfone;
bis-(4-hydroxyphenyl) diphenyl disulfone;
4,4'-dihydroxydiphenyl ether;
4,4'-dihydroxy-3,3'-dichloro diphenyl ether; and
4,4'-dihydroxy-2,5-diethoxydiphenyl ether.

A variety of additional dihydric phenols which may be employed to provide such carbonate polymers are disclosed in U.S. Patent 2,999,835—Goldberg—assigned to the assignee of the present invention. It is, of course, possible to employ two or more different dihydric phenols or a dihydric phenol in combination with a glycol, a hydroxy terminated polyester, or a dibasic acid in the event a carbonate copolymer rather than a homopolymer is desired for use in the preparation of the polycarbonate mixtures of the invention.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated at reduced pressures of the order of from about 10 to about 100 mm. of mercury, preferably in an inert atomsphere, such as nitrogen or argon, for example.

Although the polymer forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Synthesis" (4th edition, McGraw-Hill Book Company, 1952), pages 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonte esters which may be used are dimethyl carbonate, diethyl carbonate, phenylmethyl carbonate, phenyltolyl carbonate and di(tolyl) carbonate.

A preferred method for preparing the carbonate polymers suitable for use in providing the craze resistant polycarbonate mixtures of the present invention involves the use of a carbonyl halide, such as phosgene, as the carbonate precursor. This method involves passing phosgene gas into a reaction mixture containing the dihydric phenol and an acid acceptor such as a tertiary amine (e.g., pyridine, dimethylaniline, quinoline etc.). The acid acceptor may be used undiluted or diluted with inert organic solvents as, for example, methylene chloride, chlorobenzene, or 1,2-dichloroethane. Tertiary amines are advantageous since they are good solvents as well as acid acceptors during the reaction.

The temperature at which the carbonyl halide reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the craze-resistant polycarbonate resin mixtures of the invention comprises adding phosgene to an alkaline aqueous suspension of the dihydric phenol used. This is preferably done in the presence of inert solvents such as methylene chloride, 1,2-dichloro ethane and the like. Quaternary ammonium compounds may be employed to catalyze the reaction.

A fourth method for preparing such carbonate polymers involves the phosgenation of an agitated suspension of the anhydrous alkali salts of the dihydric phenol used in a non-aqueous medium such as benzene, chlorobenzene, and toluene. This reaction is illustrated by the addition of phosgene to a slurry of the sodium salt of 2,2-bis-(4-hydroxyphenyl)-propane in an inert polymer solvent such as chlorobenzene. The organic solvent should preferably be a polymer solvent but need not necessarily be a good solvent for the reactants.

Generally speaking, a haloformate such as the bishaloformate of 2,2-bis-(4-hydroxyphenyl)-propane may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer non-solvent, such as heptane or isopropanol. Alternatively, the polymer solution may be heated to evaporate the solvent.

The resistance to environmental stress crazing and cracking of the polycarbonate resin mixtures prepared in accordance with the invention was determined by subjecting stressed specimens to environments of acetone, heptane and carbon tetrachloride. The specimens were prepared by molding the resin mixtures into bars measuring ½-inch x ⅛-inch x 2½ inches. Values of the desired stress were applied to each test bar with the aid of a four point loading jig which permitted very accurate and precise settings of the deflection of the bar under test.

Each of the three solvents employed in the tests used to determine the improved environmental stress crazing and cracking resistance of the polycarbonate resin mixtures of the invention was found to be different in its attack upon the bars to be tested. For example, acetone at relatively low strains (ca. 0.4%–0.5%) will produce fine craze marks which are visible for about 20–25 seconds after immersion of the sample after which the sample begins to haze. At higher levels of strain in acetone, break-through of the sample occurs. By "break-through" I refer to an abrupt, disruptive separation of the bar into two parts. Generally speaking, break-through takes place in acetone within the first three seconds after immersion of the strained test bar into that solvent. I have observed that if a strained test bar immersed in acetone does not break-through within the first three seconds it will not experience break-through when left in the solvent for periods of time up to 10 minutes or more. The exposure of the test sample in acetone is done in two phases when the test sample is transparent. The first phase involves finding the percent strain at which initial craze formation just does not take place. This is done at various strain levels by watching for craze mark formation, i.e., fine hair-like cracks perpendicular to the direction of stress, in the stressed part up to the time the surface of the sample begins to haze (about 25 seconds after immersion). The second phase is the determination of the percent strain at which break-through just does not take place in the strained sample.

Depending upon the type of sample, homogeneity, etc., the strain at which craze formation just does not take place, hereafter called the "craze formation point," and designated as "CFP," can be determined to the nearest 0.02% strain. Similarly the strain level at which break-through just does not take place, hereafter called the "break-through point," and designated as "BTP," can be determined to the nearest 0.05% strain.

Since heptane has a much milder effect on craze formation on polycarbonate resin parts than does acetone, much higher strain levels must be employed to produce craze marks in the stressed sample while the sample is immersed in heptane. Heptane differs from acetone in two marked respects: (1) heptane does not cause hazing of the stressed part and (2) heptane does not bring about break-through no matter how high a strain is applied to the part. The craze formation point for heptane exposure is determined by immersing the bar at various strain levels in heptane for about one minute. In the case of transparent bars, the presence or absence of craze marks is easily detected by observing the bar in a good light against a dark background. By tilting the bar at various angles, the light will reflect off the craze marks. In the case of translucent or opaque bars, craze marks may be observed by the use of a hand magnifying glass. Such craze marks appear as dark lines usually starting from the edges, and extending into the bar. All of the craze marks, however, are perpendicular to the sides of the bar and to the direction of the applied stress.

Of the three solvents employed to determine the improved stress and craze resistance of the polycarbonate resin mixtures of the invention, carbon tetrachloride is the most drastic in its action on the test samples. When test bars fabricated of unmodified polycarbonate resin, such as, for example, poly(2,2-diphenyl propane)-carbonate are immersed in carbon tetrachloride, molded-in strains, probably at levels as low as 0.05–0.10% strain, were revealed by cracks that appeared in the direction of the flow of the resin in the mold employed to prepare the bars. Carbon tetrachloride does not bring about hazing in the test samples as did acetone nor does it produce the more uniform craze pattern as does heptane. As the strain level of a test bar immersed in carbon tetrachloride is increased, a break-through point is reached at which a crack forms perpendicular to the direction of the stress. This crack progresses across the bar over several seconds until a complete separation of the bar into two parts is achieved. Tests in CCl₄ are run for 3-4 minutes as a maximum.

In order that those skilled in the art may better understand how the present invention may be practiced, the following examples are given by way of illustration and not by way of limitation. All parts and percentages are by weight unless otherwise noted. The percent strain as reported in the following examples is the maximum percent of strain developed in the outer fibers of the test bars when placed under stress in the four-point loading jig employed in the craze tests. The value of the percent strain is derived from the formula as given at page 20 of "Design of Machine Elements," M. F. Spotts, Prentice Hall, Englewood Cliffs, N.J., October 1955. The various polycarbonate resin mixtures employed in the examples were, in all cases, molded into 2½" x ½" x ⅛" impact test bars in a one oz. or a 2½ oz. Van Dorn press. The molding temperatures used were 550-580° F. on the cylinder and nozzle with a range of from 150 to 270° on the mold.

Example 1

920 parts of powdered poly-p,p'-(2,2-diphenylpropane)-carbonate having an intrinsic viscosity of 0.54 (in dioxane at 30.3° C.) were placed in a container and the sample dried in a 125° C. oven overnight. Eighty parts of polyethylene pellets having a density of 0.95 and melt index of 9.0 were placed in a second container and also dried (at 60-70° C.) overnight. The following morning the two samples were allowed to cool for about 25 minutes at room temperature and the polyethylene sample was added to the polycarbonate and the container sealed. The pellets and powder were then blended by rotating and shaking the sealed container.

The above procedure was repeated except that 80 parts of polypropylene pellets having a density of 0.91 were substituted for the polyethylene.

A John Royle extruder was then set at 480° F. at all zones and the die. The two samples prepared were respectively added to the extruder and the extrudate chopped to provide the mixtures in pellet form. Sample bars of each mixture were then molded on a Van Dorn press to provide bars measuring ⅛ x ½ x 2½ inches. Bars of the original unmodified polycarbonate resin were also prepared.

Craze and crack resistance tests were then made on the bars so prepared with the following results:

TABLE I

| Sample | Percent Strain | | |
|---|---|---|---|
| | BTP in Acetone | CFP in Heptane | BTP in CCl₄ |
| Unmodified Polycarbonate | 0.52 | 0.78 | 0.20 |
| Polycarbonate plus 8% Polyethylene | 1.09 | 1.20 | 0.49 |
| Polycarbonate plus 8% Polypropylene | 0.90 | 0.98 | 0.27 |

Example 2

By the method of Example 1, a variety of polycarbonate-polyethylene mixtures were prepared in which polyethylenes of various densities and melt indices were used. In all cases the polycarbonate used was poly-(2,2-diphenyl propane)-carbonate. Test bars were then prepared and tested for resistance to crazing and cracking as outlined above. The results obtained are shown in the following table:

TABLE II

| Polyethylene | | Percent Strain | | |
|---|---|---|---|---|
| Content, Percent | Melt Index | Density | BTP in Acetone | CFP in Heptane | BTP in CCl₄ |
| 0 | (Control) | | 0.52 | 0.78 | 0.20 |
| 0.25 | 0.3 | 0.95 | 0.58 | 0.95 | 0.24 |
| 0.5 | 0.3 | 0.95 | 0.60 | 0.95 | 0.28 |
| 1.0 | 0.3 | 0.95 | 0.95 | 0.95 | 0.26 |
| 1.5 | 0.3 | 0.95 | 0.66 | 1.00 | 0.28 |
| 2.0 | 2.0 | 0.94 | 0.77 | 0.98 | 0.33 |
| 2.0 | 23.0 | 0.928 | 0.85 | 1.03 | 0.35 |
| 2.0 | 50.0 | 0.915 | 0.85 | 0.96 | 0.33 |
| 8.0 | 0.3 | 0.95 | 1.53 | 1.09 | 1.09 |
| 8.0 | 4.0 | 0.95 | 1.59 | 1.09 | 0.50 |
| 8.0 | 1.5 | 0.96 | 1.31 | 1.09 | 0.46 |
| 8.0 | 0.2 | 0.97 | 1.26 | 1.09 | 0.42 |
| 8.0 | 0.4 | 0.95 | 1.42 | 1.09 | 0.42 |
| 8.0 | 4.0 | 0.94 | 1.75 | 1.15 | 0.46 |
| 8.0 | 0.96 | 0.96 | 1.31 | 1.09 | 0.33 |
| 8.0 | 8.3 | 0.962 | 1.15 | 1.09 | 0.33 |
| 8.0 | 1.5 | 0.953 | 1.20 | 1.26 | 0.42 |

The above results demonstrate that polyethylene of varying densities and melt indices may be used to provide the craze-resistant carbonate resin mixture of the invention.

Example 3

By the method of Example 1, a variety of polycarbonate-polypropylene mixtures were prepared in which polypropylenes of various melt indices were used. In all cases the polypropylene used had a density of 0.91 and the polycarbonate employed was poly-(2,2-diphenyl propane)-carbonate. Test bars were prepared from the various mixtures and were tested for resistance to crazing and cracking as outlined above. The results obtained are shown in the following table:

TABLE III

| Polypropylene | | Percent Strain | | |
|---|---|---|---|---|
| Content, percent | Melt Index | BTP in Acetone | CFP in Heptane | BTP in CCl₄ |
| 0 | (Control) | 0.83 | 0.60 | 0.22 |
| 2 | 0.7 | 0.74 | 0.96 | 0.33 |
| 2 | 12.0 | 0.74 | 0.98 | 0.24 |
| 2 | 1.5 | 0.70 | 1.07 | 0.24 |
| 8 | 0.7 | 1.09 | 1.07 | 0.37 |
| 8 | 12.0 | 1.09 | 1.09 | 0.44 |
| 8 | 1.5 | 1.31 | 1.15 | 0.44 |
| 8 | 3.5 | 1.31 | 1.26 | 0.53 |
| 8 | 3.5 | 1.37 | 1.20 | 0.46 |
| 8 | 0.7 | 1.09 | 1.20 | 0.46 |

The above results demonstrate that like polyethylenes, polypropylenes of various melt indices may be successfully employed to provide the craze-resistant polycarbonate resin mixtures of the invention.

Example 4

The following table shows the results of craze tests conducted on molded bars prepared from polycarbonate-polyethylene and polycarbonate-polypropylene mixtures in which the polyethylene and polypropylene content was greater than 10 percent. In all cases the polycarbonate employed was poly-(2,2-diphenyl propane)-carbonate.

TABLE IV

| | Percent Strain | | |
|---|---|---|---|
| | BTP in Acetone | CFP in Heptane | BTP in CCl₄ |
| 11% Polyethylene | 1.31 | 1.26 | 0.46 |
| 15% Polyethylene | >2.20 | 1.59 | 0.74 |
| 20% Polyethylene | >2.20 | 1.53 | 0.82 |
| 25% Polyethylene | >2.20 | 1.53 | 0.82 |
| 33% Polyethylene | >2.20 | 2.10 | >2.00 |
| 40% Polyethylene | >2.20 | >2.00 | 1.90 |
| 33% Polypropylene | >2.20 | 1.80 | 1.30 |
| 40% Polypropylene | >2.20 | 1.50 | >2.00 |

Example 5

By the method of Example 1, a number of nylon (polyamide)-polycarbonate mixtures were prepared. In all cases the polycarbonate employed was poly-(2,2-diphenyl propane)-carbonate. Test bars were then prepared and tested for resistance to crazing and cracking as outlined above. The results obtained are tabulated below:

TABLE V

| Percent | | Percent Strain | | |
|---|---|---|---|---|
| Poly-carbonate | Polyamide | BTP in Acetone | CFP in Heptane | BTP in CCl₄ |
| 99.75 | ¹ 0.25 | 0.65 | 0.80 | 0.22 |
| 88 | ¹ 12 | 1.30 | 0.95 | 0.28 |
| 50 | ¹ 50 | 1.85 | 0.90 | 0.95 |
| 99.75 | ² 0.25 | 0.75 | 0.85 | 0.22 |
| 88 | ² 12 | 0.70 | 0.80 | 0.26 |
| 50 | ² 50 | 2.00 | 1.30 | 1.70 |

¹ Polyamide used was nylon 6/6.
² Polyamide used was nylon 6.

Example 6

By the method of Example 1, polycarbonate mixtures were prepared by admixing poly(2,2-diphenyl propane)-carbonate with polyethylene acrylate, and polyisobutylene respectively. Test bars were prepared from these polycarbonate mixtures and tested for resistance to cracking and crazing as outlined above. The results obtained are shown in the following table:

TABLE VI

| Ingredients in Mixture | Percent Strain | | |
|---|---|---|---|
| | BTP in Acetone | CFP in Heptane | BTP in CCl₄ |
| 8% polyethylene acrylate, 92% poly (2,2-diphenyl propane)-carbonate. | 0.98 | 1.09 | 0.42 |
| 10% isobutylene, 90% poly(2,2-diphenyl propane) carbonate | 0.82 | 1.50 | 1.15 |

Example 7

A mixture of 11 parts of isophthalic acid and 89 parts of 2,2-bis-(4-hydroxyphenyl)-propane were phosgenated in accordance with the method disclosed in U.S. Patent 3,030,381, assigned to the same assignee as this invention, to provide a carbonate copolymer containing both carbonate and carboxylate groups. The copolymeric product so obtained was dried, passed through a John Royle extruder, and the extrudate chopped to provide pellets of the copolymer. By the method outlined in Example 1, test bars were prepared from mixtures of this copolymer with polyethylene, and the bars tested for resistance to crazing and cracking as outlined above. The results obtained are given in the following table:

TABLE VII

| Percent | | Percent Strain | | |
|---|---|---|---|---|
| Copolymer | Polyethylene | BTP in Acetone | CFP in Heptane | BTP in CCl₄ |
| 100 | (Control) | 0.27 | 0.82 | 0.28 |
| 98 | 2 | 0.33 | 0.90 | 0.31 |
| 95 | 5 | 0.49 | 0.92 | 0.33 |

In addition, a resinous mixture was prepared by admixing 10 parts of polyethylene with 90 parts of a carbonate copolymer which was prepared by phosgenating a mixture of 2,2-bis-(4-hydroxyphenyl)-propane and 3,3-bis-(4-hydroxy phenyl)-pentane and which had an intrinsic viscosity of 0.58. Test bars prepared from the unmodified copolymer exhibited values of breakthrough points in acetone and in CCl₄, and craze formation points in heptane similar to those obtained by testing bars of the unmodified poly(2,2-diphenyl propane)-carbonate. Bars prepared from the 10% polyethylene-90% copolymer mixture gave values of BTP in acetone of 0.95%, BTP in CCl₄ of 0.46% and CFP in heptane of 1.15%.

Example 8

By the method of Example 1, a number of cellulose ester-polycarbonate mixtures were prepared. In all cases the polycarbonate employed was poly(2,2-diphenyl propane)-carbonate. Test bars were then prepared and tested for resistance to crazing and cracking as outlined above. The results obtained are shown in the table below.

TABLE VIII

| Percent | | Percent Strain | | |
|---|---|---|---|---|
| Poly-carbonate | Cellulose Ester | BTP in Acetone | CFP in Heptane | BTP In CCl₄ |
| 99.75 | ¹ 0.25 | 0.70 | 0.95 | 0.22 |
| 88 | ¹ 12 | >2.20 | 0.90 | 0.24 |
| 50 | ¹ 50 | >2.20 | 0.90 | >2.20 |
| 99.75 | ² 0.25 | 0.60 | 0.80 | 0.22 |
| 88 | ² 12 | >2.20 | 0.80 | 0.26 |
| 50 | ² 50 | >2.20 | 0.75 | >2.20 |
| 95 | ³ 5 | 1.55 | 0.80 | 0.20 |
| 90 | ³ 10 | >2.20 | 0.78 | 0.28 |

¹ Cellulose ester used was cellulose acetate.
² Celluluose ester used was cellulose propionate.
³ Cellulose ester used was cellulose acetate-butyrate.

Example 9

By the method of Example 1, a number of polyvinyl acetal-polycarbonate mixtures were prepared. In all cases the polycarbonate employed was poly(2,2-diphenyl propane)-carbonate. Test bars were then prepared and tested for resistance to crazing and cracking as outlined above. The results obtained are shown in Table IX below.

TABLE IX

| Percent | | Percent Strain | | |
|---|---|---|---|---|
| Poly-carbonate | Polyvinyl acetal | BTP in acetone | CFP in Heptane | BTP in CCl₄ |
| 99.75 | ¹ 0.25 | 0.80 | 0.90 | 0.20 |
| 88 | ¹ 12 | 0.45 | 1.70 | 0.24 |
| 50 | ¹ 50 | 1.10 | 0.75 | 0.65 |

¹ Polyvinyl acetal used was polyvinyl formal.

Example 10

A mixture containing 5% of polyethylene and 95% of poly(2,2-diphenyl propane)-carbonate was prepared in accordance with Example 1 and the mixture so obtained pelletized by extruding and chopping. The pellets of this material were subsequently extruded in a 1⅛" John Royle extruded equipped with a film die and appropriate take-off equipment. The extruded cylinder zones were set at 500–525° F. and the die was maintained at 480–500° F. The film was extruded easily and without any difficulty. The tensile heat distortion temperature of the film thus obtained was 152° C. as obtained by ASTM test 1637.

Example 11

By the method of Example 1, a number of polyurethane elastomer-polycarbonate mixtures were prepared. In all cases the polycarbonate employed was poly(2,2-diphenyl propane)-carbonate. Test bars were then prepared and tested for resistance to crazing and cracking as outlined above. The results obtained are tabulated below:

TABLE X

| Percent | | Percent Strain | | |
|---|---|---|---|---|
| Poly-carbonate | Poly-urethane Elastomer | BTP in Acetone | CFP in Heptane | BTP in CCl₄ |
| 99.75 | 0.25 | 0.70 | 0.85 | 0.22 |
| 88 | 12 | 2.10 | 1.20 | 0.32 |

Example 12

By the method of Example 1, a number of alkyl cellulose ether-polycarbonate mixtures were prepared. In all cases the polycarbonate employed was poly(2,2-diphenyl propane)-carbonate. Test bars were then prepared and tested for resistance to crazing and cracking as outlined above. The results obtained are shown in the table below.

TABLE XI

| Percent | | Percent Strain | | |
|---|---|---|---|---|
| Polycarbonate | Alkyl Cellulose Ether | BTP in Acetone | CFP in Heptane | BTP in CCl₄ |
| 99.75 | ¹ 0.25 | 0.40 | 0.90 | 0.26 |
| 88 | ¹ 12 | 1.90 | 0.95 | 0.42 |
| 50 | ¹ 50 | 1.30 | <.70 | 0.90 |

¹ Alkyl cellulose ether employed was ethyl cellulose.

By virtue of the present invention, there are provided a new class of polycarbonate resin mixtures having improved resistance to environmental stress crazing and cracking. Such resinous mixtures may be cross-linked by means of electron irradiation, and may be used in molding powder formulations either alone or in combination with fillers, such as, for example, wood flour, diatomaceous earth, silica, carbon black, to make molded parts of various shapes. They are useful in preparing gaskets, tubing, and other materials which have an improved resistance to crazing and cracking when in contact with organic cleansing solvents such as acetone, heptane or carbon tetrachloride.

Films of the improved polycarbonate resin mixtures of the invention are useful as wrapping or packaging materials, as metal or fiber lines, containers, covers, closures, electrical insulating tapes, electrical capacitors, sound recording tapes, and pipe coverings.

Films and fibers of the material may be beneficially oriented or drawn at elevated temperatures such as from 50° C. to 200° C. Fibers of the material may be used for yarn, thread, bristles, rope, etc. and are readily dyed.

Because of their improved craze-resistant properties, the polycarbonate resin mixtures of the present invention may be used as surface coverings for appliances and the like, or as coatings for rods and wire, as slot insulation in dynamoelectric machines and as bonding materials for parts for laminates as well as in adhesive formulations. They are also efficacious as wire enamels and may be readily admixed with pigments, stabilizers, and plasticizers. The compositions of the invention may also be admixed with other resinous materials.

The addition of polyphenylene oxide polymers to polycarbonate resins to provide resinous mixtures having particularly improved craze-resistant properties is described and claimed in copending application Serial No. 209,248 filed July 11, 1962, now U.S. Patent 3,221,080, and assigned to the same assignee as the present invention.

What I claim as new and desire to secure by Letters Patent of the United States is:

1. A resin mixture comprising (1) poly(2,2-diphenyl propane)-carbonate and (2) a modifier comprising at least one member of the class consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ether, and a polyurethane elastomer, said modifier being present in said mixture in an amount ranging from about 0.25 to about 50% by weight of modifier and resin and in an amount sufficient to impart to said mixture a resistance to environmental stress crazing and cracking greater than that possessed by said polycarbonate resin.

2. A resin mixture comprising (1) polycarbonate derived from a 4,4'-dihydroxy-di(mononuclear aryl) alkane, and (2) an olefin polymer selected from the group consisting of polyethylene, polypropylene, and copolymers of ethylene-propylene; component (1) being at least 50% by weight of (1) and (2), and component (2) being in an amount not exceeding 50% by weight of (1) and (2).

References Cited

UNITED STATES PATENTS 2,789,970  4/1957  Reynolds et al. _____ 260—873

FOREIGN PATENTS 910,033  11/1962  Great Britain.

WILLIAM H. SHORT, *Primary Examiner.*

F. D. ANDERSON, *Assistant Examiner.*

U.S. Cl. X.R.

260—860, 857, 858, 32.8, 33.6, 33.8, 37, 41; 204—159.12, 159.16; 117—161; 161—183